Oct. 26, 1943.  F. E. HAND  2,332,713
DISPENSING MECHANISM
Filed April 18, 1941  2 Sheets-Sheet 1
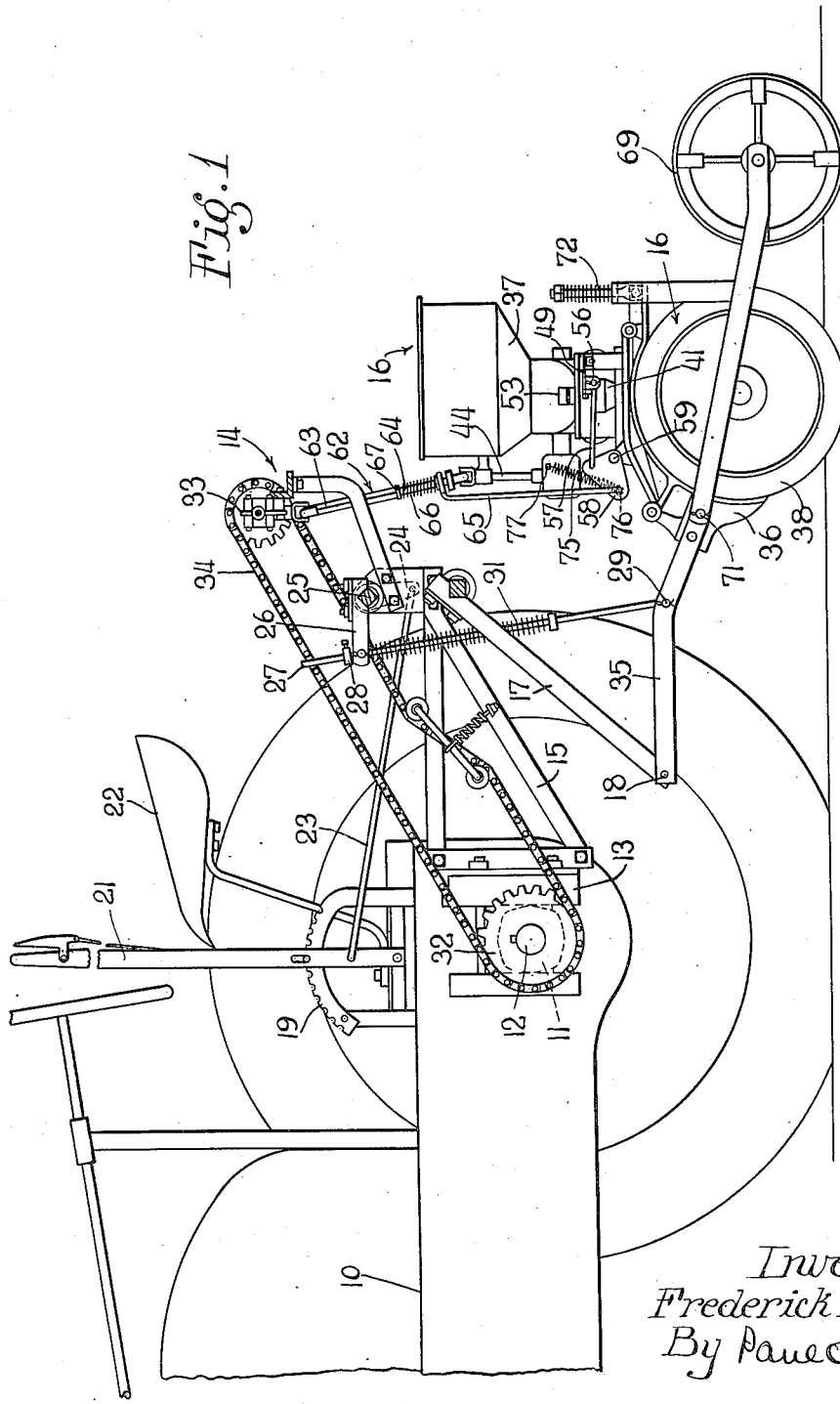
Inventor
Frederick E. Hand
By Paul O. Pippel
Atty.

Oct. 26, 1943.  F. E. HAND  2,332,713
DISPENSING MECHANISM
Filed April 18, 1941  2 Sheets-Sheet 2
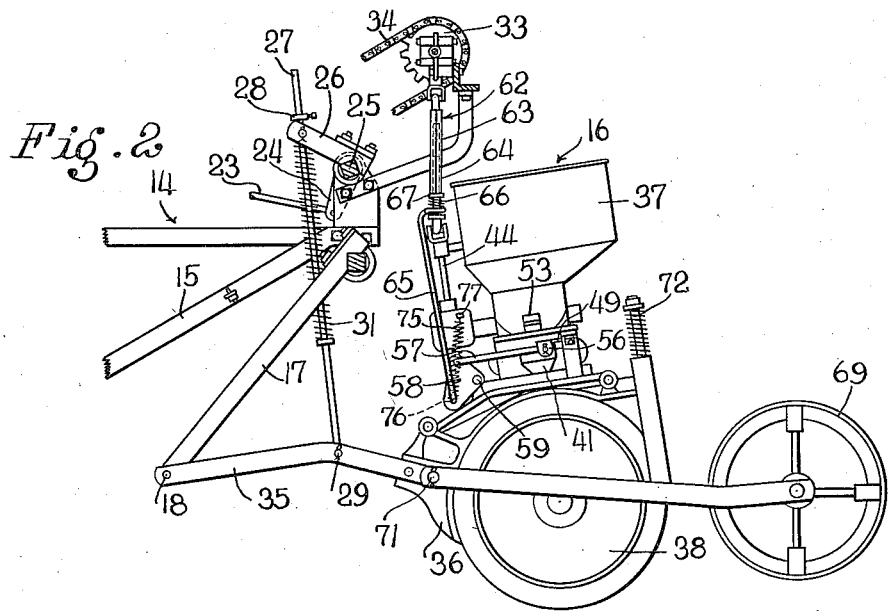
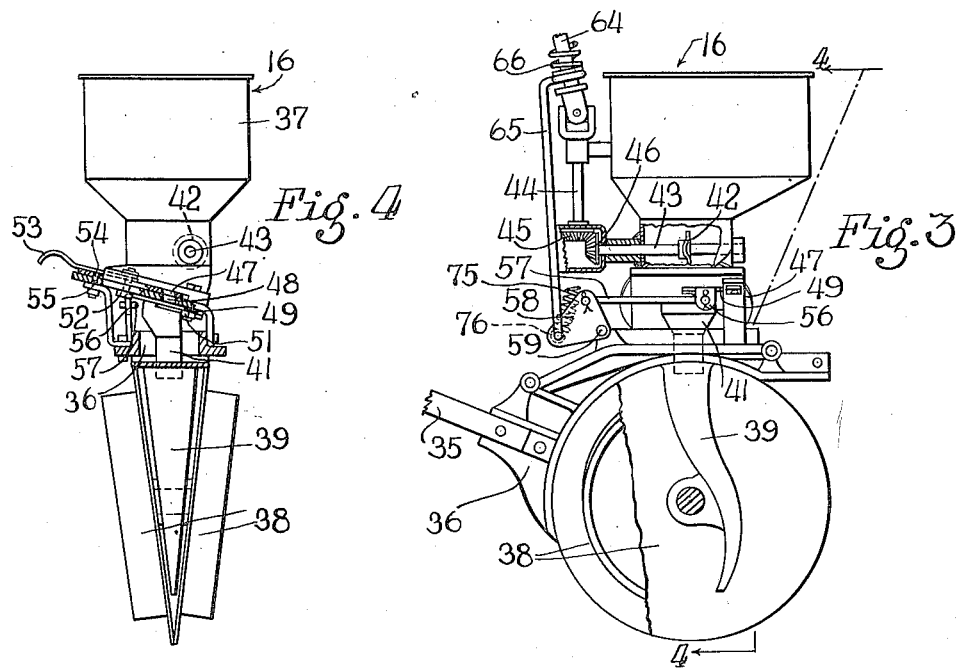
Inventor
Frederick E. Hand
By Paul O. Pippel
Atty.

Patented Oct. 26, 1943

2,332,713

UNITED STATES PATENT OFFICE 2,332,713

DISPENSING MECHANISM

Frederick E. Hand, Canton, Ill., assignor to International Harvester Company, a corporation of New Jersey Application April 18, 1941, Serial No. 389,213

8 Claims. (Cl. 111—67)

This invention relates to dispensing mechanisms such as planter tools and the like adapted for attachment to a tractor or other tool-supporting means, and more particularly to means for controlling or cutting off the flow of material or seed from the dispensing mechanism upon the mechanism or planter tool being moved from its operating position.

It is another object of the present invention to provide a simple and novel cut-off arrangement for planter tools and the like upon the same being raised from its planting or operating position.

It is another object of the invention to provide a shut-off mechanism which is adapted to cooperate with the driving connection between the tractor and the planter tool for effecting cutting off the flow of seed or material upon the planter tool being raised to transport position.

According to the present invention, there is provided on a tractor a supporting frame to which may be attached a dispensing or planter tool mechanism for movement to and from its dispensing or planting position. On this supporting frame is mounted a driving means adapted to derive power from the tractor and from which power is delivered to the planter tool mechanism to operate the seed or material agitator therein by means of a driving connection including telescoping parts having sliding movement with respect to each other to permit the planter tool to have certain vertical movement during its operation and at the time of the lifting of the planting tool by means associated with the tractor and its supporting frame. Forming a part of the planter tool mechanism is a valve adapted for cutting off the flow of seed from the planter tool. Connected between the telescoping part of the drive connection for the agitating means, which is adapted to react axially against the supporting frame, is means for operating the cut-off valve when the planter tool frame is lifted. This operating means reacts against this telescoping part of the drive connection means and hence against the supporting frame of the tractor. In so doing, by virtue of links and a lever, the valve is automatically moved to its closed or cut-off position as the planter tool means is raised from its operating position. In order to allow for certain play of the planter tool frame when it is in its operating position, the connection of the links of the valve-operating means with the telescoping part is provided to have lost-motion as found by the use of a biasing spring.

For other objects and for a better understanding of the invention, reference may be made to the following detailed description taken in connection with the accompanying drawings, in which:

Figure 1 is a view in elevation of a portion of a tractor and of the implement attachment including the features of the present invention;

Figure 2 is a view of the implement attachment similar to that shown in Figure 1, but with the planter tool mechanism raised and with the linkage adjusted to effect closing of the cut-off valve of the planter tool;

Figure 3 is an enlarged view in elevation of the planter tool itself and of the valve-operating means therefor; and, Figure 4 is a view of the planter tool means taken along the lines 4—4 of Figure 3 and illustrating particularly the location of the valve with respect to the seed or material orifices in the planter tool.

Referring now particularly to Figure 1, there is shown a tractor 10 having a rear axle structure 11 through which extends a rear axle 12. On this rear axle structure is provided means 13 adapted for the attachment of implements to the tractor. Connected to this implement-attaching means on the tractor is the dispensing or planter tool attachment indicated generally at 14. This planter tool includes a supporting frame structure 15, to which is pivotally connected for vertical movement a dispensing mechanism or planter tool indicated generally at 16. The supporting frame 15, when taken with the tractor, provides a tool-supporting means. This planter tool is pivotally connected to the forward end of a downwardly and forwardly extending arm member 17 carried by the supporting frame 15, the connection being that of a pivotal connection as indicated at 18. The planter tool means 16 is caused to operate about the pivot 18 by a manual lifting mechanism 19 including a lever 21 accessible to an operator's station 22 on the rear axle structure 11 of the tractor. The manual adjusting lever 21 has connected to it a link 23 extending rearwardly for connection to an arm 24 on a rockshaft 25 mounted for rotational movement on the supporting frame 15. Connected to this rockshaft 25 is a lifting arm 26, through which extends a lift rod 27 having a collar 28 with which the arm 26 may cooperate to effect, during clockwise movement of the arm 26, the lifting or vertical movement of the planter tool means 16 from its planting position to assume a transport position as shown in Figure 2. The lift rod 27 is connected with the planter tool means 16, as indicated at 29, at a location removed from the pivot connection. A usual pressure spring 31 may be used for maintaining the cutting tool means in its ground position. It should thus now be apparent that, if the lever 21 is moved forwardly from its location shown in Figure 1, the planting tool means 16 will be raised from its planting position, this being accomplished by means of the arms and links just described.

Connected to the tractor axle 12 is a sprocket 32 by means of which power derived from the tractor is delivered to a sprocket 33 located on the supporting frame by means of a chain 34.

The planter tool means 16 includes a longitudinally extending frame means 35 to the rearward end of which is connected a supporting bracket structure 36. This bracket structure 36 serves as a support for a material or seed can structure 37. Furrow opening discs 38 are pivoted to the bracket structure 36 and, extending downwardly between these discs, is a seed spout 39 through which the seeds from the seed can are directed for deposit in a furrow formed by the furrow opening discs.

As viewed particularly in Figure 3, immediately below the seed can there is provided a funnel 41 for directing of the seed into the seed spout 39. Within the seed can 37 is an agitator wheel 42 carried on a shaft 43, which extends externally of the seed can for connection with a vertically extending shaft 44 supported on the seed can structure 37. This shaft 44 has at its lower end a bevel gear 45 adapted for connection with a bevel gear 46 on the shaft 43. This agitating wheel, its shaft 43, and the vertical shaft 44 serve as means on the planter tool adapted to be driven. As the agitator wheel 42 is rotated, the continued flow of seed from the seed can is maintained. As viewed particularly in Figure 4, the seed passes through an opening in a seed plate 47 and then through an opening in a supporting bracket 48, to which is pivoted a valve plate 49, as indicated at 51. Upon the seed leaving the opening in the bracket structure 49, it is then directed to the funnel 41, and finally to the seed spout 39. The seed plate 47 is circular in shape and can rotate about a pivot bolt 52. These seed plates have a variety of openings of different diameter for the passage of seed therethrough and can be rotated about the pivot bolt 52 into any position so that one of these openings will register with the opening in the bracket structure 48, the opening selected in the seed plate depending upon the nature and kind of material or seeds to be dispensed by the dispensing mechanism. To hold the seed plate in its rotated position, there is provided a flat spring means 53 adapted to be retained at one end thereof by the pivot bolt 52 and having a downwardly extending pin 54 adapted to project through an opening in the seed plate and then into an opening 55 in the bracket structure 48.

The cut-off valve 49 rotates in a substantially horizontal plane about its pivotal connection 51 with the bracket structure 48. On the free end of this plate is a depending portion 56 adapted for the connection thereto of a link 57. The other end of the link 57 is connected to a lever element 58 which is pivoted on the bracket structure 36, as indicated at 59. When the lever element 58 is rotated about its pivot 59, motion is imparted to operate the valve plate 49 into or out of its registration with the opening in the bracket structure 48.

Connected between the means on the planter tool adapted to be driven and the sprocket 33 on the supporting frame 15 is a driven connection means 62 including a pair of telescoping parts 63 and 64 slidable with respect to each other to permit vertical movement of the planter tool means 16 while in the ground-operating position and when the same is lifted from its planting position. Since the telescoping part 63 is connected indirectly to the frame structure 15, it may be said that the part provides a reaction means against which parts, desired to be given movement upon the planter tool means being moved to transport position, may react. Hence, according to the present invention, use is made of this fact to impart movement to operate the valve means 49. To accomplish this, there is provided a link 65 connected to the telescoping part 63 through a coil spring 66 surrounding the telescoping part 64. Since the telescoping part 63 has a flange 67 of sufficient diameter to receive the end of the coil spring 66, this spring will react thereagainst. Thus, as the planter tool means 16 is raised from its planting position, the link 65 will also be raised until the coil spring 66 is compressed sufficiently to provide a solid connection with the telescoping link 63, and then movement will be imparted to the valve plate 49, the link 65 being then also rigid to cause the lever 58 to rotate in a counter-clockwise direction about its pivot connection with the bracket structure 36. As this rotation of the lever 58 is effected, the valve plate is moved to a position to close the opening in the bracket structure 48. The upper end of the link 65 is turned back upon itself to provide an eye opening for its connection with the telescoping part 64. The spring 66 contacts thusly with the upper end of the link 65.

When the planter tool means is lowered into its operating position, the telescoping parts of the connection means 62 will be extended and the spring 66 will be released to impart movement of the upper end of the link 65 with respect to the flange 67 of the telescoping part 63, thereby effecting opening of the valve plate 49. The planter tool means 16 may also include the usual covering wheel structure 69 pivoted, as indicated at 71, to the bracket structure 36 maintained in its effective covering position by biasing means 72 adapted to react against the bracket structure 36. To normally maintain the valve plate 49 in the open position, there is provided a spring 75 connected between the lever 58 at 76 and the means adapted to be driven, as at 77.

It should now be apparent that there has been provided a simple arrangement for cutting off the flow of seed automatically when the planter tool means is moved out of its planting position wherein use is made of the usual drive connection means between the tractor and the planter tools.

While various changes may be made in the detail construction, it shall be understood that such changes shall be within the spirit and scope of the present invention as defined by the appended claims.

What is claimed is:

1. In combination, supporting means, material dispensing mechanism including driving means carried by the supporting means and a part connected to the supporting means for movement to and from its dispensing position, valve means associated with the part connected to the supporting means for movement, said part having means adapted to be driven, means for moving the movable part of the dispensing mechanism from its dispensing position, means drivingly connecting the driving means carried on the supporting means with the means on the movable part adapted to be driven, and means reacting against said drivingly connecting means to operate said valve means to close the same upon the movable part of the dispensing mechanism being moved from its dispensing position.

2. In combination, planter tool supporting means, seed planter tool means including driving means carried by the planter tool supporting means and a part connected to the planter tool supporting means for movement to and from its working position, means on the planter tool supporting means and connected to the movable part of the planter tool means for moving the same, said movable part of the planter tool means including means adapted to be driven and a valve for controlling the flow of seed from the planter tool means, means drivingly connecting the driving means carried on the planter tool supporting means with the means on the movable part adapted to be driven, means connected to the valve and reacting against the drivingly connecting means for operating said valve to close the same upon the movable part of the planter tool means being moved from its planting position by the moving means.

3. In combination, planter tool supporting means, seed planter tool means connected to the planter tool supporting means for movement to and from its planting position, means for moving the planter tool means, said planter tool means including means adapted to be driven, power means on the planter tool supporting means, driving connection means between the power means and the means adapted to be driven, valve means for controlling the flow of seed from the planter tool means, means connected to the valve and reacting against the driving connection means for operating said valve to close the same upon the planter tool means being moved from its planting position.

4. In combination, supporting means, material dispensing mechanism connected to the supporting means for movement to and from its dispensing position, means for moving the dispensing mechanism, said dispensing mechanism including means within the same adapted to be driven, power means on the supporting means, driving connection means between the power means and the means within the dispensing mechanism adapted to be driven, valve means for controlling the flow of material from the material dispensing mechanism means, means connected to the valve means and reacting against the driving connection means for operating the valve means to close the same upon the dispensing mechanism being moved from its dispensing position.

5. In combination, supporting means, material dispensing mechanism connected to the supporting means for movement to and from its dispensing position, means for moving the dispensing mechanism, said dispensing mechanism including means within the same adapted to be driven, power means on the supporting means, driving connection means between the power means and the means within the dispensing mechanism adapted to be driven, said driving connection means including telescoping parts one of which is adapted to react axially against the supporting means and the other of which is slidable with respect to the one to permit movement of the dispensing mechanism, a valve for controlling the flow of material from the dispensing mechanism, means for operating the valve to close the same upon the dispensing mechanism being moved from its dispensing position, said operating means including a link connected to the one telescoping driving part to react thereagainst to impart thereby movement to the valve.

6. In combination, a tractor, a planter tool supporting frame connected to the tractor, a seed planter tool means pivotally connected to the supporting frame for vertical movement to and from its planting position, means for lifting the planter tool means including means on the supporting frame connected with the planter tool means, said planter tool means including means for agitating the seed and valve means for controlling the flow of seed from the planter tool means, drive means on the supporting frame deriving power from the tractor, drive connection means between the drive means on the supporting frame and the agitating means in the planter tool means to drive the latter, and means adapted to react against the drive connection means for closing said valve means upon the planter frame being moved from its planting position.

7. In combination, planter tool supporting means, seed planter tool means connected to the planter tool supporting means for movement to and from its working position, means on the planter tool supporting means and connected to the planter tool means for moving the same, said planter tool means including a valve for controlling the flow of seed from the planter tool means, means connected to the valve and reacting against the planter tool supporting means for operating said valve to close the same upon the planter tool means being moved from its planting position by the moving means, said latter means including a spring to provide lost motion to permit normal movement of the planter tool means in its planting position and to open the valve upon the planter tool means being returned to its planting position.

8. In combination, a supporting structure, a material dispensing mechanism including driving means carried on the supporting structure and a working part connected to the supporting structure for movement from one position to another position, said working part including means adapted to be driven and control means adapted to be operated incident to movement of the working part to control the flow of material, means drivingly connecting the driving means on the supporting structure with the means on the working part adapted to be driven, and means reacting against the said latter drivingly connecting means to operate the control means on the working part without interrupting the driving of the means adapted to be driven upon the working part being moved from one position to another position.

FREDERICK E. HAND.